Jan. 7, 1969  K. D. CASHION  3,421,004

SOLAR OPTICAL TELESCOPE DOME CONTROL SYSTEM

Filed Aug. 31, 1967  Sheet 1 of 2

Kenneth D. Cashion
INVENTOR

BY
ATTORNEYS

United States Patent Office 3,421,004
Patented Jan. 7, 1969

3,421,004
SOLAR OPTICAL TELESCOPE DOME
CONTROL SYSTEM
Kenneth D. Cashion, P.O. Box 161,
Friendswood, Tex. 77546
Filed Aug. 31, 1967, Ser. No. 665,676
U.S. Cl. 250—203                                        5 Claims
Int. Cl. G01j 1/20; G01c 17/34; G01c 21/02

ABSTRACT OF THE DISCLOSURE

A dome control system utilizes a plurality of sun vanes mounted externally of the dome. The vanes are placed so as to keep two cadmium selenide cells in the shadow when the sun is shining through the shutter of the dome. At a predetermined time, the dome shutter will open and a telescope will start tracking. When the sun illuminates the dome the dome will rotate until the sun illuminates the telescope. As the sun approaches the western edge of the shutter, the shadow line of the sun vanes begin to illuminate the western cell which starts the dome to rotate to the west until the dome illuminates the eastern cell which stops the dome rotation. Means are also provided so that should the sun be obscured by the clouds, the dome does not rotate until the sun reappears; then the dome will rotate until it is properly aligned with the sun.

---

The invention described herein may be manufactured and used by or for the Government of the United States of America for governmental purposes without the payment of any royalties thereon or therefor.

The invention relates in general to light sensitive controls and more particular to solar optical telescope dome control system.

With the advent of high altitude manned flight, one of the hazards encountered is that of nuclear radiation caused by solar disturbances known as solar flares. These solar flares are "storms" on the surface of the sun which releases considerable amounts of energy. Some of this energy is in the form of clouds of protons which, when they reach the earth-lunar vicinity, increase the radiation level in the upper atmosphere.

In addition to being an earth hazard, this radiation could damage operating electronic equipment and, therefore, it is necessary to know:

(1) When a solar flare is imminent;
(2) When a solar flare has occurred;
(3) If the flare has produced a proton event; and
(4) Will the proton event reach earth-lunar areas?

To accomplish the above, a world-wide network of solar observatories are necessary. There must be 24 hours of coverage and sufficient overlap of coverage so that should one of the observatories have excessive cloud cover, another observatory could supply the data for that time period.

In order to develop the technology and data processing capabilities of solar proton detection, routine patrol work must be accomplished by taking numerous photographs all day long everyday of the year. The solar instrument used for taking photographs must be started at sunrise and track the sun till sundown. Then the photographic film is removed from the telescopic camera for processing and reduction.

Most solar patrol work is done by observatories as part of their normal solar research work, and therefore, comprehensive automatic control devices are not required of these observatories as the working staff is normally present at all times. When automatic controls are used to operate the dome covering the solar optical telescope, photovoltaic vacuum tubes are mounted on the telescope spar. These tubes are exposed to sunlight until the telescope tracks the sun near the edge of the dome shutter, at which time a photovoltaic cell is placed in the dome shadow. When this occurs the dome rotates.

Thus, in the few facilities where automatic tracking techniques are required, and photovoltaic vacuum tubes are utilized, as the telescope tracks in the right ascension, the spar rotates in relation to the local vertical shutter making it necessary to have several photovoltaic tubes on these spars. Further, the telescope spar must be carefully balanced, and any addition to the spar must be compensated for by balancing. Moreover, photovoltaic tubes require some means of attaching to the spar and a method of collimation, i.e., a lens or series of diaphragms in a long tube in order to get the directional qualities required.

The normal life of a photovoltaic tube is limited, and with the normal operation of the tube utilizing a high intensity light source such as the sun's rays, the life of the photovoltaic tube is even more limited. Moreover, the use of photovoltaic tubes, with their accompanying high impedance, makes it necessary to use vacuum tubes in the remainder of the circuitry, and, as is well-known, vacuum tubes, being active devices, require a definite amount of maintenance.

Another problem in the use of conventional control equipment which utilizes photovoltaic control devices is that should clouds obscure the sun, the telescope continues driving at the normal 15° per hour, but the dome does not rotate. If the sun is obscured more than two hours, the telescope has all sensors in the dome shadow and the dome does not rotate until manually advanced to permit the photovoltaic tubes to view the sun unless extremely complex electromechanical systems are utilized.

In order to overcome the disadvantages of prior art telescope tracking techniques, the present invention utilizes light sensors which are cadmium selenide cells hermetically sealed in window-type T0–5 transistor cans. The cells are passive devices and thus have extremely long lives. Further, the dome rotation instrument is made totally independent of telescope drive or guide systems which keeps the telescope as a viewing instrument at all times. Moreover, the sensing equipment is mounted externally of the dome. The arrangement of the cadmium selenide cells together with sun vanes keep the cells in the shadow a substantial portion of the time, thus keeping cell resistance high and cell current low. This operation permits a large safety factor when operating the cells for reliability.

More particularly, the present system utilizes a plurality of sun vanes mounted externally of the dome. The vanes are placed so as to keep two cadmium selenide cells in the shadow when the sun is shining through the shutter. The cell resistance is inversely proportional to illumination. At a predetermined time in the morning, if the humidity and rain functions permit, the dome shutter will open and the telescope will start tracking at a predetermined time. When the sun illuminates the dome, the dome will rotate until the sun illuminates the telescope. As the sun approaches the western edge of the shutter, the shadow line of the sun vanes begin to illuminate the western cadmium selenide cell, which starts the dome to rotate to the west until the sun illuminates the east cell which stops the dome before the eastern edge of the shutter blocks the telescope's view of the sun. Should the sun be obscured by the clouds, the dome does not rotate until the sun reappears. Then the dome will rotate until it is properly aligned with the sun. Should the sun be obscured during a normal driving step, the dome will continue to drive in a forward, east to west direction until it comes to the sunset-of-the-longest-day position, at which time the dome will reverse and start from west to east. If the sun is illuminating the dome, the dome will stop when properly aligned. If the sun is still obscured, the dome will rotate to sunrise-of-the-longest-day-position and stop. When the sun does illuminate the dome, the dome will rotate to the proper position. The loss of photographic data is minor during this search time, since the maximum period of rotation is short when compared to the rate of exposure and sunrise to sunset operation of the telescope. If humidity or rain circuits detect such conditions, the shutter will not open, or if open will close, or if opening will stop and close.

The advantage of this invention, both as to its construction and mode of operation, will be readily appreciated as the same become better understood by reference to the following detailed description when considered in connection with the accompanying drawings in which like reference numerals designate like parts throughout the figures, and wherein.

Figure 1:
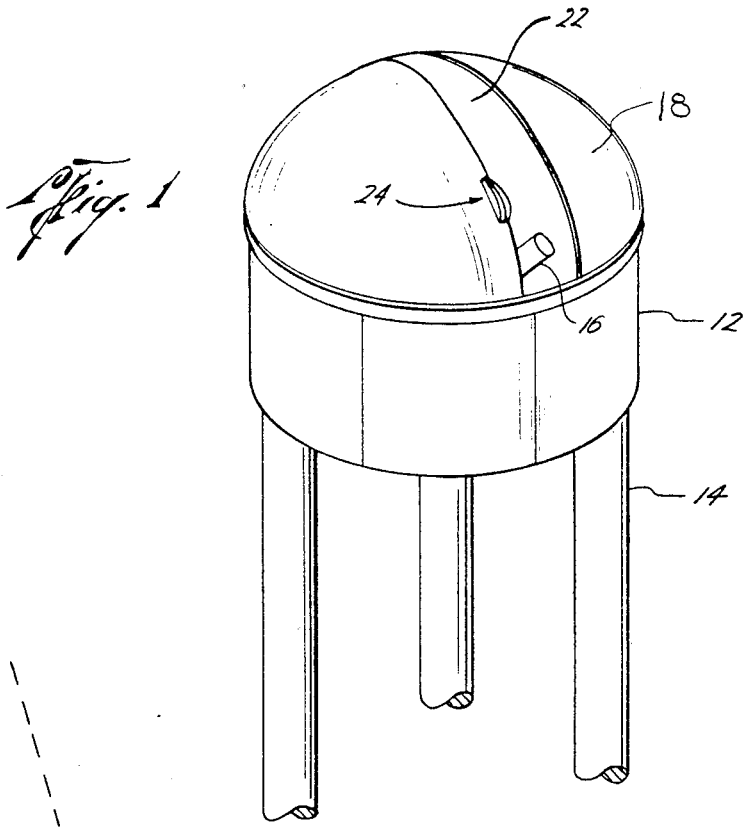
FIG. 1 depicts a telescope installation containing the novel dome control system.

Referring now to the drawings, there is shown in FIG. 1 a telescope installation having a dome base 12 which may be supported to a fixed structure, such as the ground, by legs 14. The legs 14 allow the telescope to be raised into air which is less heat disturbed so as to minimize the shimmer of the image when viewed through a telescope 16.

The telescope 16, which is used to observe the sun, is positioned within a rotatable dome 18. A shutter (not shown) in the dome is opened so that an aperture 22 exposes the telescope 16 to observe the sun. Fixedly mounted on the dome, adjacent to the aperture 22, is the sun-tracking device 24. As the sun rotates during the daytime, the movement of the sun is detected by the device 24 and allows the dome 18 to rotate, as will be explained hereinafter.

Figure 2:
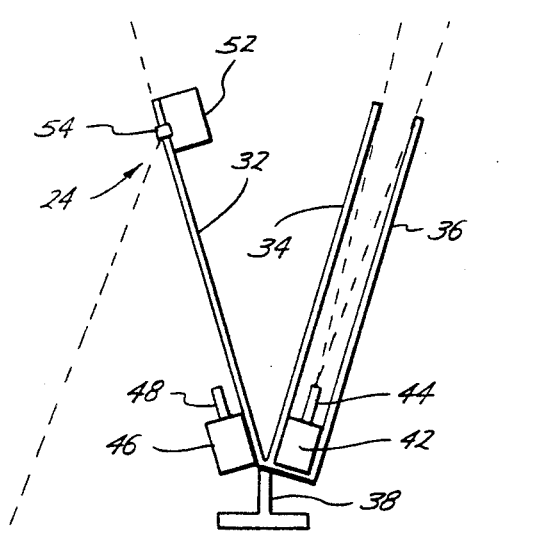
FIG. 2 depicts a preferred embodiment of the sun-tracking device incorporated in the dome control system of FIG. 1.
Figure 3:
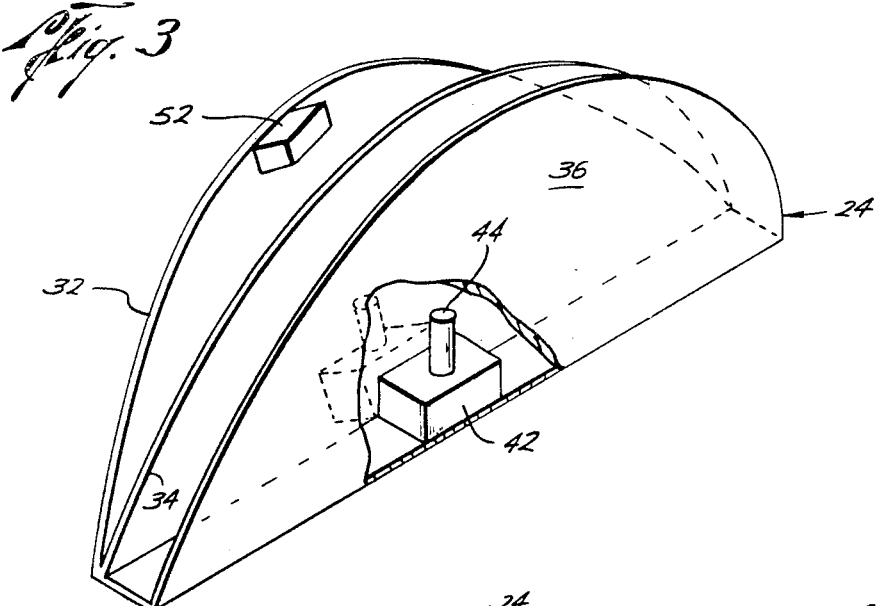
FIG. 3 depicts a prospective view of the sun-tracking device of FIG. 2.

Referring now to FIGS. 2 and 3, the sun-tracking device 24 comprises a start vane 32, a first-stop vane 34, and a second-stop vane 36. The stop vanes 34, 36 are mounted parallel to each other and at a first angle to the start vane 32. The vanes 32, 34, and 36 are normally made of a structural metal. The base of the start vane 32 and the first-stop vane 34 are joined together at their base and secured to a T-shaped structural member 38. The base of the structural member secured to the dome 18. Between the stop vanes 34, 36 is a photocell mount 42 having a light pipe 44 secured thereto. Sunlight, which passes between the parallel stop vanes 34 and 36, is detected by the light pipe 44 and transferred to a photocell contained in the photocell mount 42. A second photocell mount 46, having a light pipe 48, is secured to the start vane 32 on the far side of the start vane 32 from the stop vanes 34 and 36. Light rays, approximately parallel to the start vane 32, will be detected by the pipe 48 and transferred to a photocell within the mount 46. A third photocell mount 52, mounted on the edge of the vane 34, nearest the vane 34, has a light button 54 which extends through the vane 32. Light rays which strike the button 54 are transferred to a photocell contained within the mount 52. The vanes 32, 34, and 36 are designed to have a constant radius so that for any day of the year the rate of illumination of the light pipes 44 and 48 remain constant.

Initially, in the morning, the telescope and dome aperture are positioned to the position of sunrise-of-the-earliest-morning. If adverse rain or humidity conditions are detected by sensing instruments, the aperture 22 is automatically opened by the dome control system at a predetermined time. As the sun rises in the morning, light rays from the sun are detected by the light pipe 48 whereupon the dome rotates until the sun is detected by the light pipe 44 and whereupon the dome's rotational motor shuts off. Because of the two parallel vanes 34, 36, the sun is detected by the light pipe 44 for a normally short time and therefore the photocell within the mount 42 is energized for a short time. The sun continues to rotate until the rays once again are detected by the light pipe 48 would not detect the sun. The light button 54, however, tected by the light pipe 44, causes the dome to stop rotating. Thus the dome rotates progressively as the earth rotates. Should the sun be obscured by clouds, the dome would not rotate until the sunlight is once again detected by a photocell. Should this cloud obscuring of the sun occur for a few hours, and if it can be seen once the sun's rays again penetrate to the earth, the light pipe 48 would not detect the sun. The light button 54, however, would now be able to detect the sun and the dome would once again rotate until the sun's rays are detected by the light pipe 44. The photocells in photocell mount 46 and photocell mount 52 are electrically connected in parallel so that should light rays be detected, either by the light pipe 48 or light button 54, rotation of the dome 18 will commence.

If during the time the dome is rotating because of activation of either of the photocells in the mounts 46 or 52 the sun should become obscured by clouds, the dome will continue rotating to the position of sunset-longest-day since the light rays would not be able to be detected by the light pipe 44. If the dome has reached sunset-longest-day, it will rotate back to sunrise-earliest-day. When the sun once again is no longer obscured by the clouds, the light button 54 detects the sun's rays and the dome will rotate once again until at the correct position.

Figure 4:
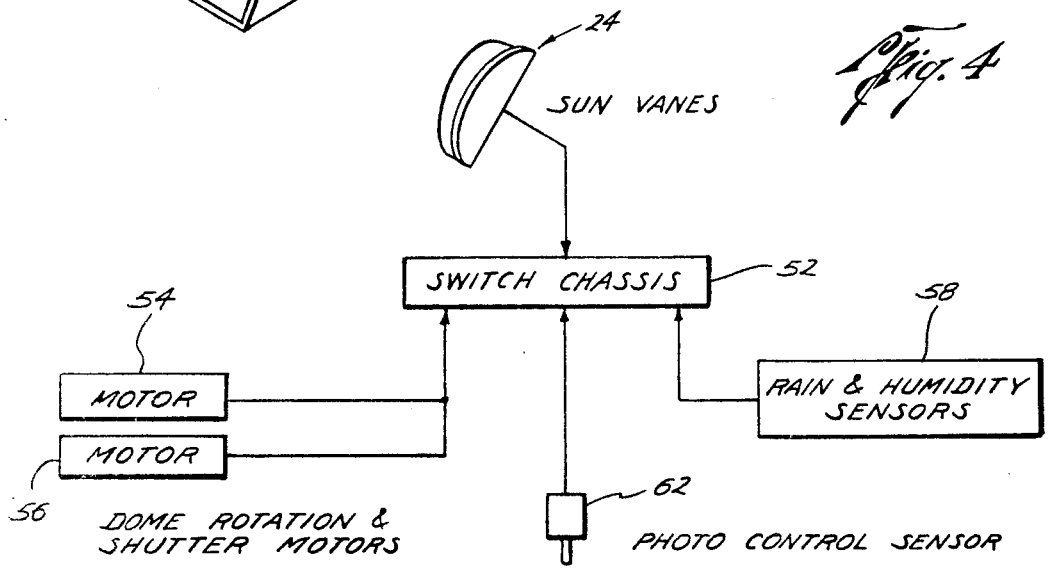
FIG. 4 depicts a block diagram embodying the dome control system.

Referring now to FIG. 4, there is shown a block diagrammatic format of the invention. Signals from the device 24 are connected to a switch chassis 52 which in turn is connected to the dome rotation motor 54 and shutter motor 56 so as to open and close the shutter and rotate the dome, as has been previously explained. These motors are also connected through the switch chassis to rain and humidity sensors 58 mounted outside of the dome so as to close the dome shutter when predetermined levels of rain and humidity have been detected. Further, a photocontrol sensor 62 that is mounted on the telescope camera (not shown) prohibits photography when the sun illumination is below a predetermined level.

While the vanes 32 and 34 are shown at a predetermined fixed angle, it should be understood, of course, that this angle is adjustable for the amount of travel desired per dome rotation step. The vanes may be made adjustable for proper shutter telescope pedestal alignment so that the sun, during most of the operation, will shine between the vanes 32, 34 when the dome shutter is at the optimum position for normal operation.

The start vane 32 and the stop vanes 34, 36 have been depicted in the drawings as mounted on the dome for northern hemisphere operation. It should be understood, however, that for southern hemisphere operation, the position of the start vane and stop vanes would be reversed.

It should also be understood that the foregoing disclosure relates only to a preferred embodiment of the invention and that it is intended to cover all changes and modifications of the examples in the invention herein chosen for the purposes of the disclosure and which do not constitute departure from the spirit and scope of the invention.

What is claimed and desired to be secured by Letters Patent is:

1. A dome control system for rotating a dome so that instruments within the dome are in a preferred viewing position with respect to the sun comprising:

(a) a first stop vane and a second stop vane spaced from each other, said vanes being mounted parallel to each other and having a common base;
(b) a start vane mounted at an angle with respect to said stop vanes and adjacent to said first start vane;
(c) means secured to said start vane for detecting light and causing said dome to start to rotate to said preferred viewing position;
(d) means secured between said stop vanes for causing said dome to stop rotating when said preferred viewing position has been reached; and
(e) means for securing said start vane and said stop vanes to said dome.

2. A dome control system in accordance with claim 1 wherein said means secured between said stop vanes comprises a cadmium selenide cell.

3. A dome control system in accordance with claim 1 wherein said vanes have a constant radius.

4. A dome control system in accordance with claim 1 wherein said means secured to said start vane comprises a cadmium selenide cell.

5. A dome control system in accordance with claim 4 wherein said means secured to said start vane further comprises a second cadmium selenide cell mounted on the edge of the start vane and having a light button extending through said start vane.

References Cited

UNITED STATES PATENTS

| | | | |
|---|---|---|---|
| 2,155,402 | 4/1939 | Clark | 33—61 |
| 3,078,372 | 2/1963 | Chase et al. | 250—203 |
| 3,229,102 | 1/1966 | Spencer et al. | 250—203 |
| 3,291,990 | 12/1966 | Lentz | 250—83.3 |
| 3,320,427 | 5/1967 | Evans et al. | 250—203 X |

JAMES W. LAWRENCE, *Primary Examiner.*

V. LAFRANCHI, *Assistant Examiner.*

U.S. Cl. X.R.

33—61

UNITED STATES PATENT OFFICE
CERTIFICATE OF CORRECTION

Patent No. 3,421,004                              January 7, 1969

Kenneth D. Cashion

It is certified that error appears in the above identified patent and that said Letters Patent are hereby corrected as shown below:

In the heading to the printed specification, lines 4 and 5, "P. O. Box 161, Friendswood, Tex. 77546" should read -- Friendswood, Tex., assignor to the United States of America as represented by the Administrator of the National Aeronautics and Space Administration --.

Signed and sealed this 31st day of March 1970.

(SEAL)
Attest:

Edward M. Fletcher, Jr.                    WILLIAM E. SCHUYLER, JR.
Attesting Officer                              Commissioner of Patents